May 7, 1929.  G. W. DRUHE  1,711,929
BRAKE LOCK
Filed Oct. 21, 1926
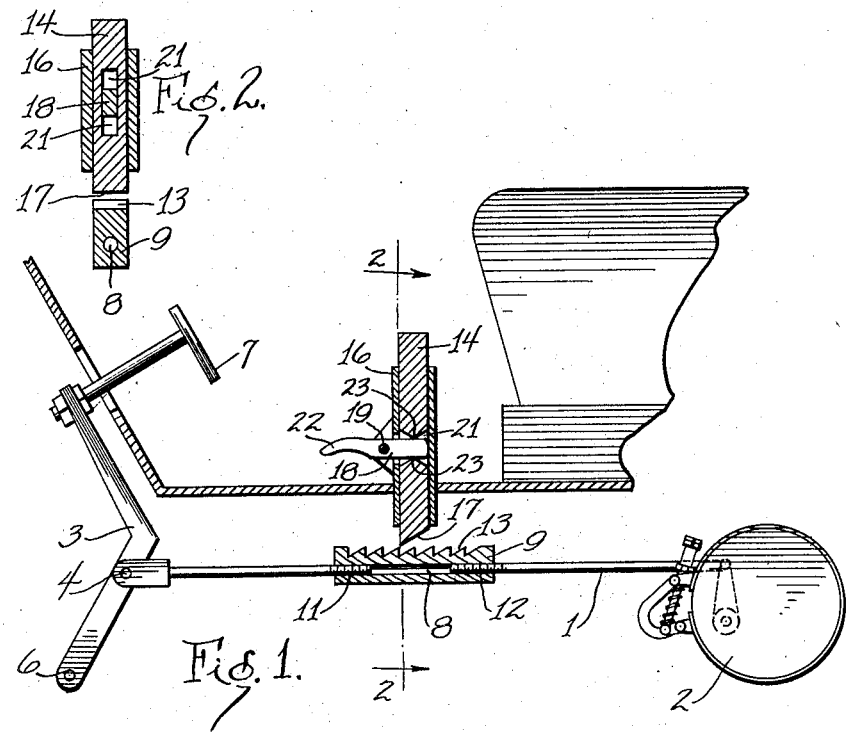
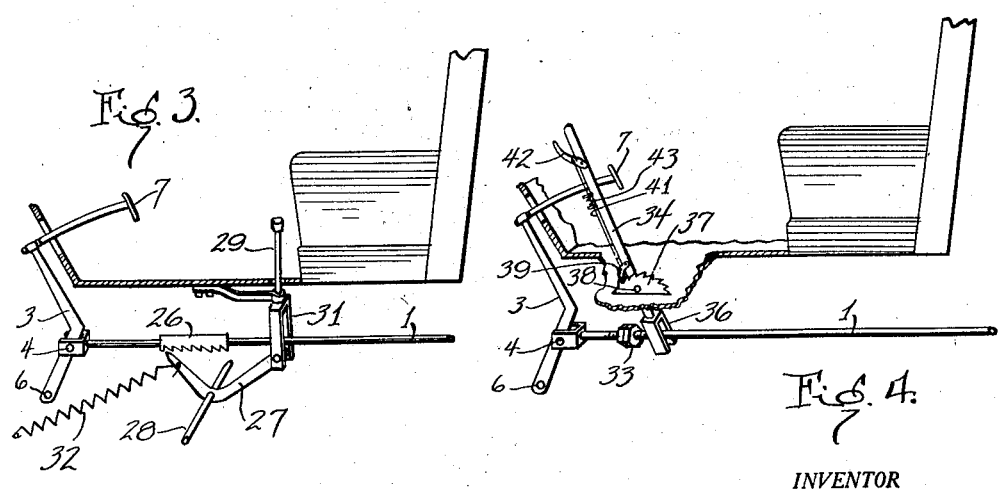
INVENTOR
G. W. DRUHE
ATTORNEY Patented May 7, 1929.

1,711,929

UNITED STATES PATENT OFFICE.

GEORGE WALTER DRUHE, OF OAKLAND, CALIFORNIA.

BRAKE LOCK.

Application filed October 21, 1926. Serial No. 143,182.

The present invention relates to improvements in brake locks and has particular reference to a means for holding the service brake of a motor vehicle in brake locking position. In the preferred form of my invention, I provide means which become active automatically upon the setting of the brakes, and in this case, positive action on the part of the driver is necessary to release the locking means. In another form, the reverse procedure is followed, and the driver positively applies the lock while release is effected by slight additional pressure on the brake pedal. In still another form, the driver locks and releases the brake pedal by manipulating a lever in one direction or the other. Further objects and advantages of my invention will appear as the specification proceeds.

The preferred forms of my invention are illustrated in the accompanying drawing in which Figure 1 shows the preferred form of my brake lock in combination with a conventional service brake structure, in side elevation, Figure 2 a vertical section taken along lines 2—2 of Figure 1, Figure 3 a modified form of brake lock, and Figure 4 a still further modified form.

While I have shown only the preferred form of my invention, I wish to have it understood that various changes or modification may be made within the scope of the claims hereto attached without departing from the spirit of the invention.

In its preferred form, as illustrated in Figures 1 and 2, the brake rod 1 connecting at its rear end to the brake mechanism 2 is pivoted at its front end to the brake lever 3 as shown at 4, the brake lever itself being pivoted as at 6 and being actuated by foot pressure brought to bear on the pedal 7. The rod 1 is broken as at 8 to form two sections, and a sleeve 9 is threaded on the two sections with opposite threads as shown at 11 and 12. The sleeve is provided with upwardly presented ratchet teeth 13 and a plunger 14 is vertically slidable in a guide 16 and formed with a tooth 17 adapted to ride on the ratchet teeth as the rod 1 is advanced and to interlock with any one of them or preventing return motion of the rod. A small lever 18 is pivoted in the guide as shown at 19 so that one end thereof extends into a slot 21 formed in the guide, while the other end extends outwardly as at 22 for manipulation by the operator. The slot 21 in the plunger is formed with tapered top and bottom walls engaging the lever 18 along registering lines 23. The manner of using this form will be readily understood from the foregoing description. As the driver bears down on the foot pedal 7 and thereby sets the brake, the plunger rides over the ratchet teeth and interlocks with one of them, when the brake is in active position. To release the brake, the driver presses on the arm 22 of the lever 18 whereby the plunger is lifted out of engagement with the ratchet teeth.

In the form shown in Figure 3, the ratchet teeth 26 are presented downwardly, and a ball crank lever 27 is pivoted on a stationary rod 28 in such a manner that one arm thereof may be engaged with the ratchet teeth while depressing a vertically movable element 29, the lower end of which is preferably formed as shown at 31 to straddle the rod 1. A spring 32 tends to pull the front arm of the ball crank lever 27 out of engagement with the ratchet teeth. In this form, after the brake has been set, the driver depresses the element 29 and thereby engages the forward end of the lever 27 with the ratchet teeth, holding the rod against endwise motion. A slight additional forward movement of the rod 1 effected by pressure on the foot pedal 7 allows the spring 32 to automatically release the ratchet member from the ball crank lever 27.

In the form shown in Figure 4, the rod 1 has two nuts 33 threaded thereon which may be adjusted to any desired position within the range of the thread and which may be locked by being screwed upon one another. A lever 34, formed as shown at 36 to straddle the rod 1, is pivoted in a ratchet member 37 as shown at 38 and provided with a pawl 39 engageable with the ratchet teeth for locking the lever against reverse motion. The pawl may be operated in the customary manner by means of a rod 41 and the link 42, a spring 43 tending to push the rod downwardly. In this form, after the brake has been set, the operator pulls the upper end of the lever 34 backwards until the lower end bears against the nuts 33, whereupon he allows the pawl 39 to engage with the adjacent ratchet tooth. To release the brake, the driver presses the link 42 toward the lever 34 for withdrawing the pawl from engagement with the ratchet teeth and pushes the upper end of the lever 34 forward which allows the rod 1 to move backward for releasing the brake.

I claim:

1. In combination, a foot-operated brake setting element, an element arranged to advance when the first element is actuated having ratchet teeth thereon, a plunger arranged to ride on the ratchet teeth and to interlock therewith to prevent return motion, a guide for the plunger and a lever pivoted in the guide and extending into the plunger with one arm thereof for lifting the same when the other arm is depressed.

2. In combination, a foot operated brake setting element, an element arranged to advance when said first element is actuated having ratchet teeth thereon, a plunger arranged to ride on the ratchet teeth and to interlock therewith to prevent return motion, a guide for the plunger, and a lever pivoted in the guide and having one arm thereof engaged with said plunger, so that said plunger may be lifted when the other arm is depressed.

In testimony whereof I affix my signature.

GEORGE WALTER DRUHE.